United States Patent
Martin et al.

(10) Patent No.: US 11,116,150 B2
(45) Date of Patent: Sep. 14, 2021

(54) AERIAL ELECTROSTATIC SYSTEM FOR WEATHER MODIFICATION

(71) Applicants: The United States of America, as represented by the Secretary of Agriculture, Washington, DC (US); Active Influence & Scientific Management, SP, San Angelo, TX (US)

(72) Inventors: Daniel E. Martin, College Station, TX (US); Arquimedes Ruiz-Columbie, San Angelo, TX (US)

(73) Assignees: The United States of America, as represented by The Secretary of Agriculture, Washington, DC (US); Active Influence and Scientific Management, SP, Lubbock, TX (US)

( * ) Notice: Subject to any disclaimer, the term of this patent is extended or adjusted under 35 U.S.C. 154(b) by 153 days.

(21) Appl. No.: 16/377,276

(22) Filed: Apr. 8, 2019

(65) Prior Publication Data
US 2020/0008370 A1 Jan. 9, 2020

Related U.S. Application Data

(60) Provisional application No. 62/695,259, filed on Jul. 9, 2018.

(51) Int. Cl.
*A01G 15/00* (2006.01)
*B64D 1/18* (2006.01)
*B05B 5/025* (2006.01)

(52) U.S. Cl.
CPC ............ *A01G 15/00* (2013.01); *B05B 5/0255* (2013.01); *B64D 1/18* (2013.01)

(58) Field of Classification Search
CPC .......... A01G 15/00; B05B 5/00; B05B 5/025; B05B 5/0255; B64D 1/16; B64D 1/18
USPC .................... 239/2.1, 14.1, 171, 3, 690, 708
See application file for complete search history.

(56) References Cited

U.S. PATENT DOCUMENTS

| 1,928,963 | A | * | 10/1933 | Chaffee | A01G 15/00 239/2.1 |
| 4,684,063 | A | * | 8/1987 | Goudy, Jr. | A01G 15/00 239/14.1 |
| 5,975,425 | A | * | 11/1999 | Carlton | A01M 7/00 239/171 |
| 2005/0056705 | A1 | * | 3/2005 | Bhumibol Adulyadej | A01G 15/00 239/2.1 |
| 2020/0196539 | A1 | * | 6/2020 | Cardi | A01G 15/00 |

* cited by examiner

*Primary Examiner* — Steven J Ganey
(74) *Attorney, Agent, or Firm* — John D. Fado; Robert D. Jones

(57) ABSTRACT

The system uses a specifically modified spray assembly to spray electrically charged fluid below selected clouds so that an updraft carries the charged fluid into the cloud and induces precipitation. The size, charge, and design of the sprayers are specifically designed to elicit precipitation.

17 Claims, 14 Drawing Sheets

AERIAL ELECTROSTATIC SYSTEM FOR WEATHER MODIFICATION

REFERENCE TO RELATED APPLICATIONS

This application claims the benefit of U.S. Provisional Application No. 62/695,259, filed Jul. 9, 2018, which is incorporated herein by reference in its entirety.

FIELD OF THE INVENTION

The disclosed method and system relates to electrostatically charged aerial applications. Specifically, the system and method described herein relates to "seeding" clouds to produce precipitation.

BACKGROUND OF THE INVENTION

Currently, cloud seeding is done by launching glaciogenic (silver iodine) and hygroscopic (calcium chloride) flares into clouds that fit a specific profile and have a specific set of characteristics so that the clouds are considered to be good candidates for seeding. The flares enhance the colloidal instability within the clouds and thereby increase the likelihood of precipitation. To deploy the flares, a pilot looks for and flies under (preferably) cumuliform clouds with a flat base that are positioned between 1,000 and 15,000 feet above ground level. An updraft of at least 200 ft/min must be present to deploy the flares.

While the currently-available flares are somewhat effective, they are relatively expensive, and a strong updraft must be present to make the best use of the flares. The need exists for a cheaper, more versatile, and preferably more effective means of seeding clouds. In lieu of flares, the method described herein (preferably) uses ordinary electrically-charged tap water sprayed from a specifically selected spray system to seed targeted clouds. The inventor's proposed system and method is more effective, flexible, efficient, and cheaper than currently used flare-based technology.

SUMMARY OF THE INVENTION

This disclosure is directed to a method of "seeding" clouds. In accordance with the method, an aircraft is equipped with a spraying system that includes at least one sprayer. The sprayer's spray nozzle produces an atomized spray. The spray nozzle is surrounded by a positively charged electrode designed to impart a negative charge to fluid spraying from the sprayer. In operation, an aircraft equipped with the spraying system takes off and locates a candidate cloud with an updraft of at least 100 ft/min. The pilot flies below the cloud and turns on the spraying system so that negatively charged pressurized fluid is sprayed out of the spray nozzles. The updraft then carries the electrically charged fluid up into the cloud and thereby seeds the cloud.

DETAILED DESCRIPTION OF PREFERRED EMBODIMENTS

Figure 1:
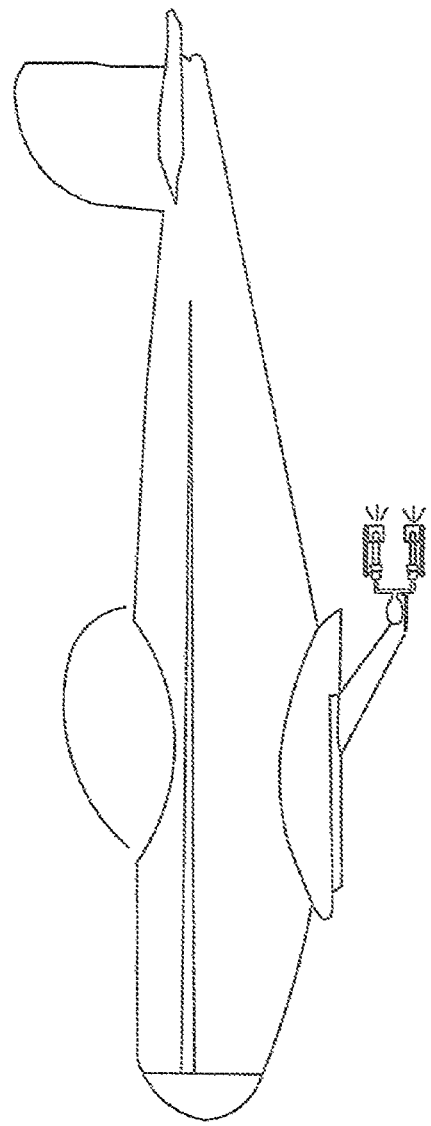
FIG. 1 is a schematic of the spray assembly of the preferred embodiment installed on an aircraft.

This disclosure is directed to a system and a method to "seed" clouds with electrically-charged fluid, and thereby enhance the likelihood of precipitation. As shown in FIG. 1, the method includes equipping an aircraft with a system of sprayers and nozzles to seed the clouds. The spray system used in the disclosed process is a modified version of the spray apparatus originally disclosed in U.S. Pat. No. 5,975,425 to Carlton, which is incorporated herein by reference.

Figure 2:
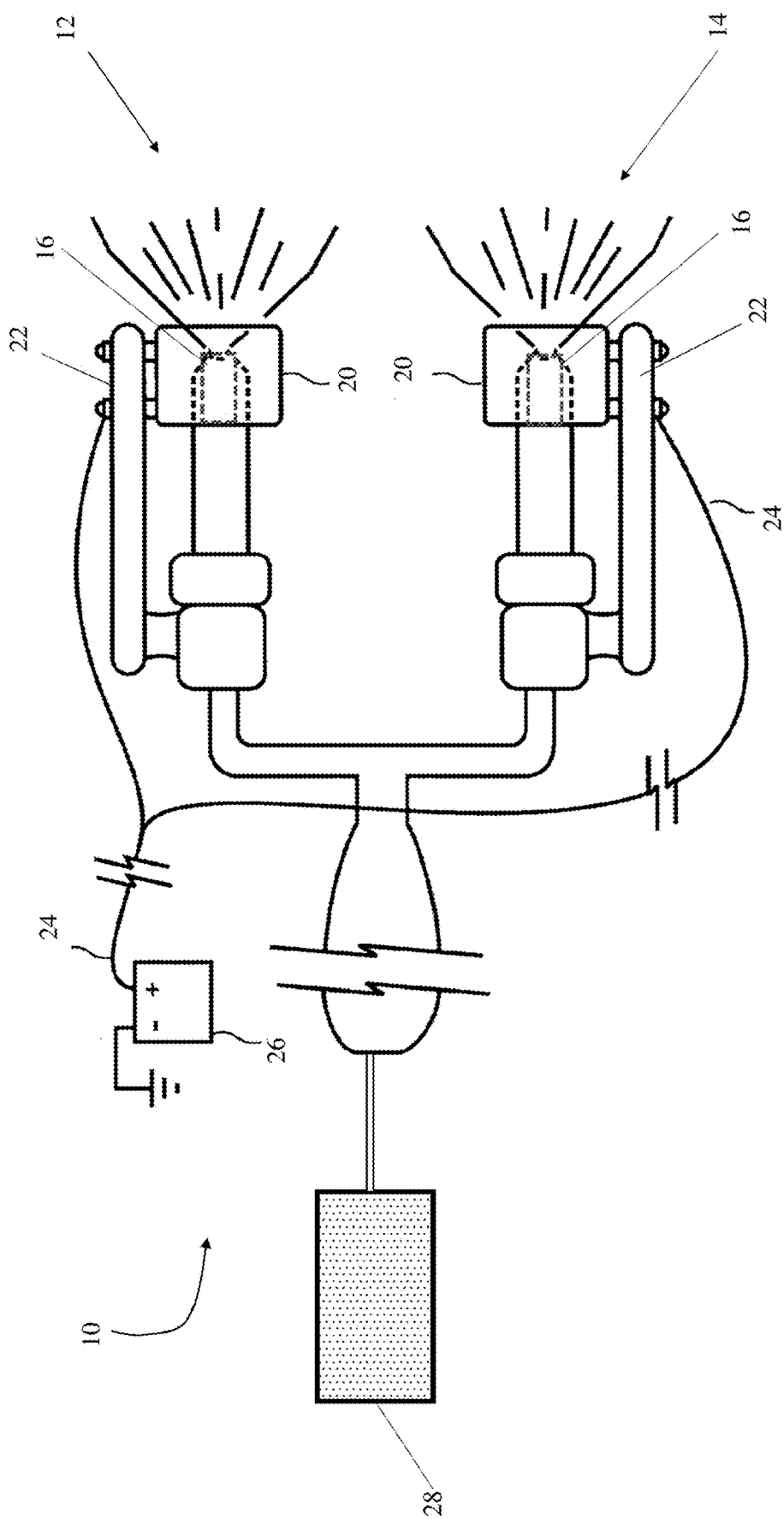
FIG. 2 is a schematic of the spray assembly.

As shown in FIG. 2, the current spray system 10 comprises at least two sprayers 12, 14. The inventors modified the Carlton sprayers by using nozzles 16 designed to generate a volumetric median diameter (VMD) spray of between 50-200 um. These types of nozzles 16 are known as "TX-VK" hollow-cone nozzles and they are manufactured by a variety of companies. This type of nozzle 16 produces a finely atomized spray pattern and provides thorough coverage for a spray area. The typical spray angle is 60° to 90° (preferably 80°) at 100 psi.

As shown in FIG. 2, the spray nozzles 16 are surrounded by electrodes 20. The electrodes 20 are attached to a charging system 26 through a structural member 22 and an associated electrical conductor 24. The charging system 26 charges all of the electrodes 20 with the same electrical polarity (preferably positive). By positively charging the electrodes 20, a negative charge is imparted to the water droplets when the droplets are sprayed from the nozzles 16. Significantly, the inventors have modified the Carlton apparatus so that the trailing edge of the electrode 20 is preferably 4.9 mm (0.0-10.0 mm) from the nozzle 16 orifice.

In operation, as shown in FIGS. 1 and 2, a spray nozzle system 10 is structurally connected to an aircraft capable of performing spray operations. The aircraft is configured to carry a hopper/tank 28 capable of holding a substantial volume of tap water. The tank 28 supplies water to the nozzles 16—thereby enabling a user to perform cloud seeding operations.

Although tap water is used in the preferred embodiment, other chargeable fluids and water-based liquids should be considered within the scope of the invention. For example, the spray operations could be conducted with any water-based solution, including purified water, salt water, or water-based fluids that include dissolved chemicals or metals that may affect/enhance the physical or electrical characteristics and performance of the fluid as it is sprayed from the aircraft.

Figure 3:
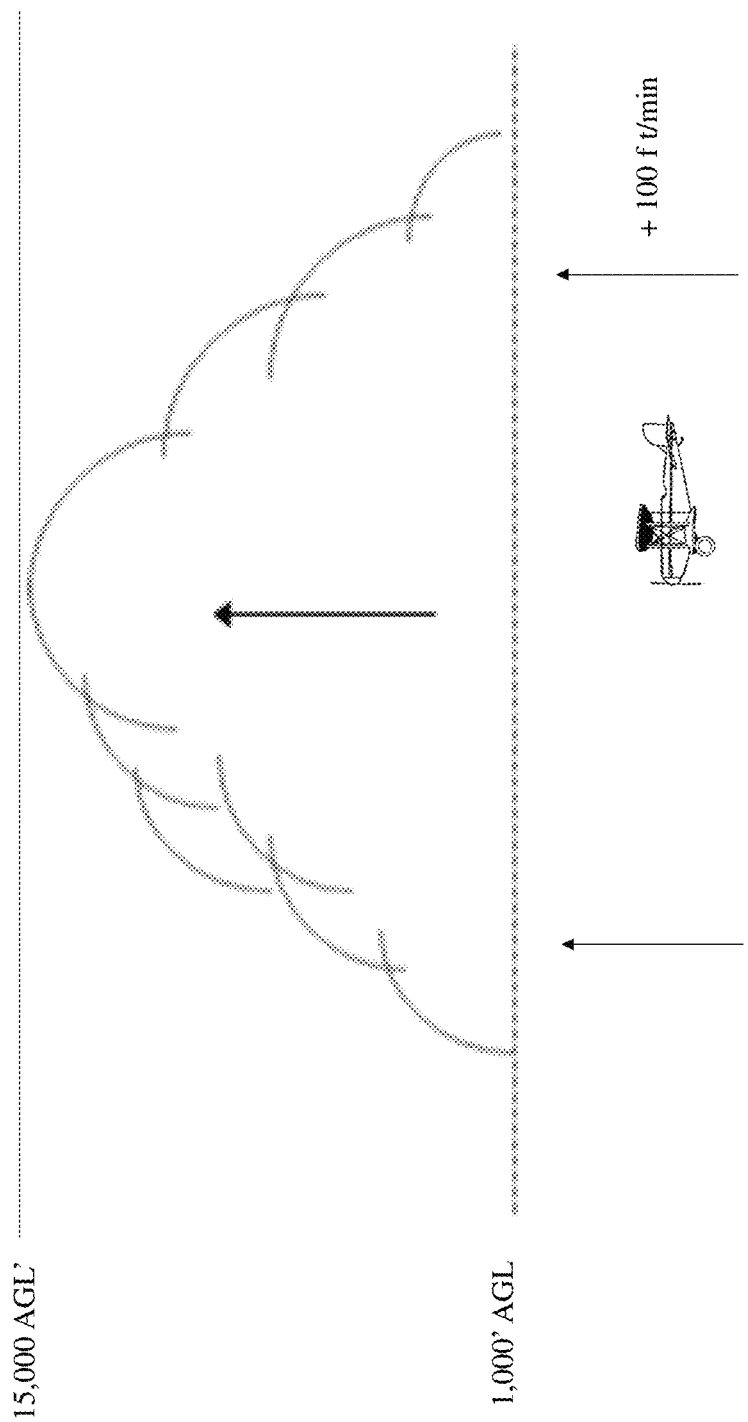
FIG. 3 shows the general operating environment and the preferred conditions for carrying out the method of the preferred embodiment.

As generally shown in FIG. 3, once the aircraft is properly configured, the aircraft takes off and looks for cumulus and cumulonimbus clouds that conform to a specific profile and have a specific set of characteristics so that the clouds are considered to be good candidates for seeding. Specifically, the aircraft pilot looks for a seedable cloud with a well-defined flat base. The cloud may be at an altitude between 1,000 and 15,000 feet above ground level (AGL). FIG. 3 shows the general operating environment and the preferred conditions for carrying out the method of the preferred embodiment Once an acceptable cloud is located, the pilot flies under the base of the cloud as close as possible while maintaining VFR flight conditions. When the updraft below a cloud exceeds 100 ft/min., the pilot turns the spray system 10 "on", and sets the liquid/water pressure flowing from the tank 28 to 50-100 psi, which yields a system flowrate to the spray system 10 of 5.0-10.0 gallons per minute. Simultaneously, the charging system 28 imparts a 2 mA electrical current (at +5.0-15.0 kV) to the liquid sprayed from the spray system 10 nozzles 16. When the updraft dissipates, the pilot shuts off the spray system 10 and searches for another cloud. This process is repeated until the pilot runs out of either fuel or water/liquid.

In alternative applications, the process and system described herein may also be used to suppress hail, dissipate fog, or remediate smog. The system and process may also be used for snow enhancement (snowpack augmentation). In those embodiments, the aircraft may fly above the clouds and spray (or otherwise deploy) a liquid/water so that the liquid drops down into the target clouds.

Field Test Results

In the summer of 2017, the inventors and an associated technical support team gathered data in the west Texas area by seeding 16 clouds using the methods described in this disclosure. The data generated by the inventors' system was compared to data gathered by seeding 51 clouds using (conventional) dual seeding systems under comparable conditions. FIGS. 4-14 graphically show the results of the inventors' methods as compared to the conventional methods, and with the results of natural processes with no human intervention (i.e. the "control" or "do nothing" option).

Figure 4:
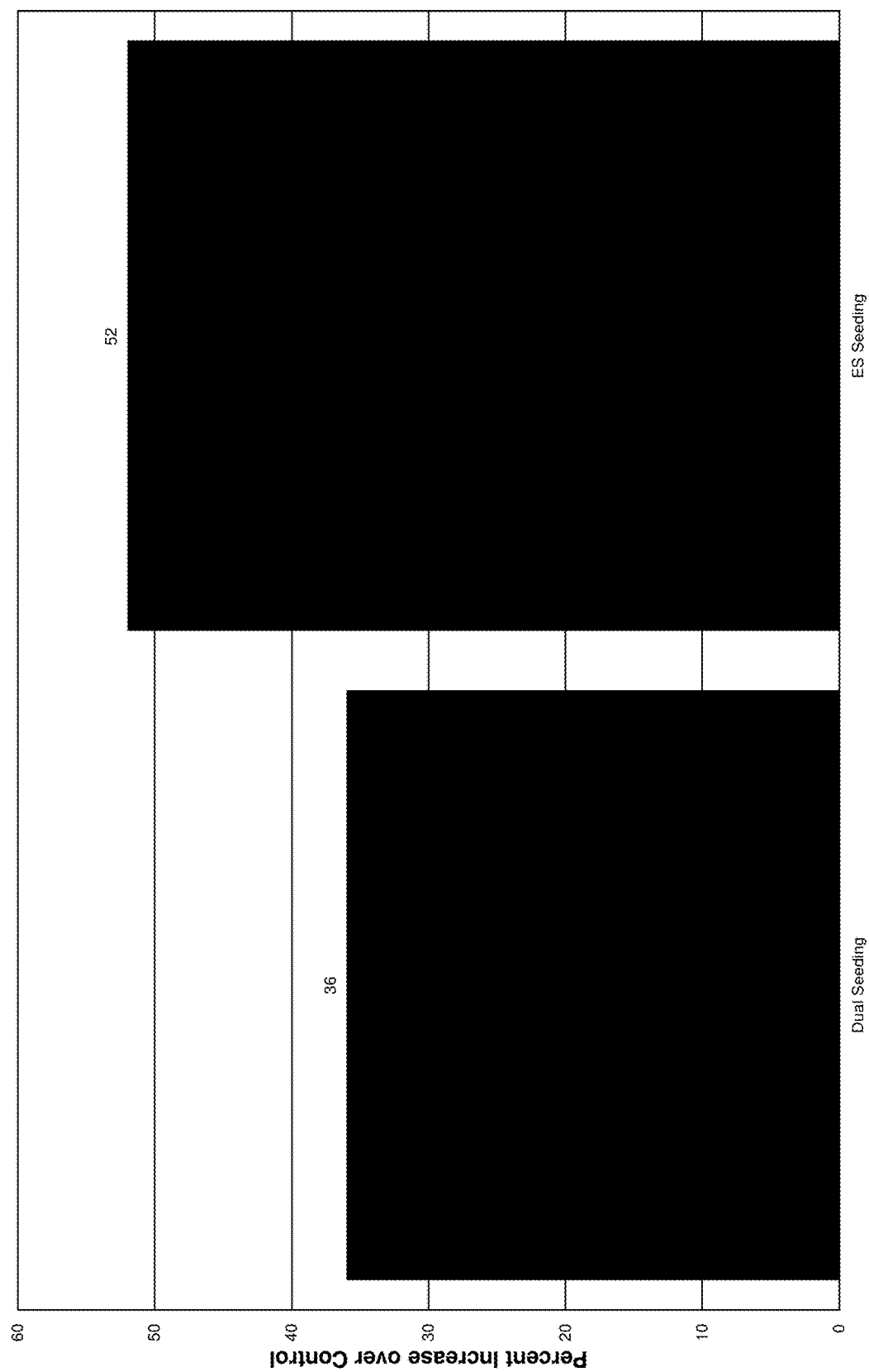
FIG. 4 shows the increase in lifetime of the storms due to electrostatic (ES) seeding. The duration of the storm can be extended by a more efficient warm rain process and/or the creation of ice within a storm. Latent heating will allow the storm to grow vertically adding to its lifetime. A longer lasting storm will produce more water over a larger area of land.
Figure 5:
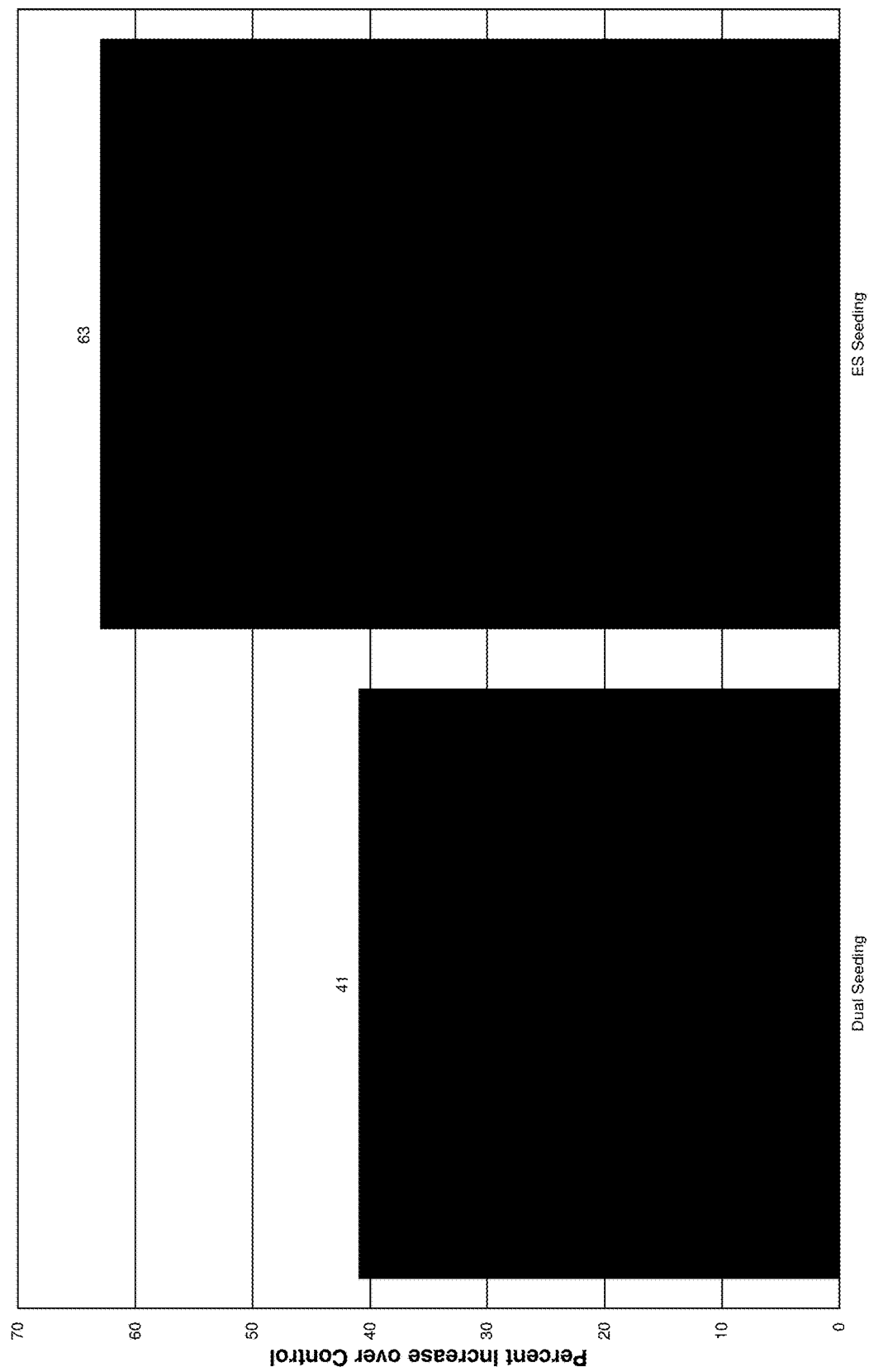
FIG. 5 shows the increase in area of the storms due to ES seeding. This is the 2-dimensional size of the storm. The more land the storm covers, the larger the impact. Increasing the area of a storm increases the number of individuals to be impacted by the benefits of cloud seeding.
Figure 6:
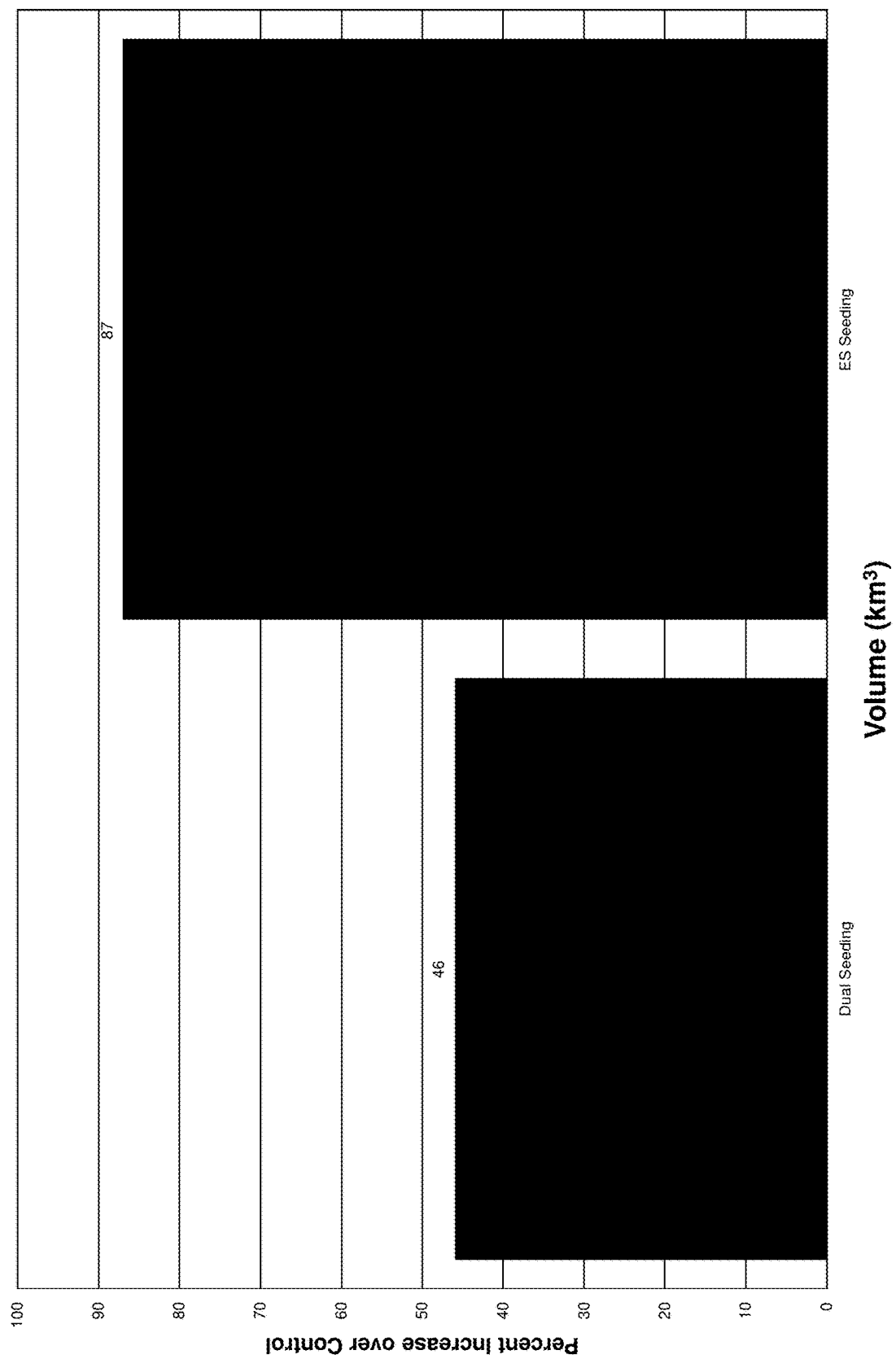
FIG. 6 shows the increase in Volume of the storms due to ES seeding. This is the 3-dimensional size of the storm. This measurement includes area but also includes cloud depth. The larger and deeper the storm, the greater the likelihood of it holding more water.
Figure 7:
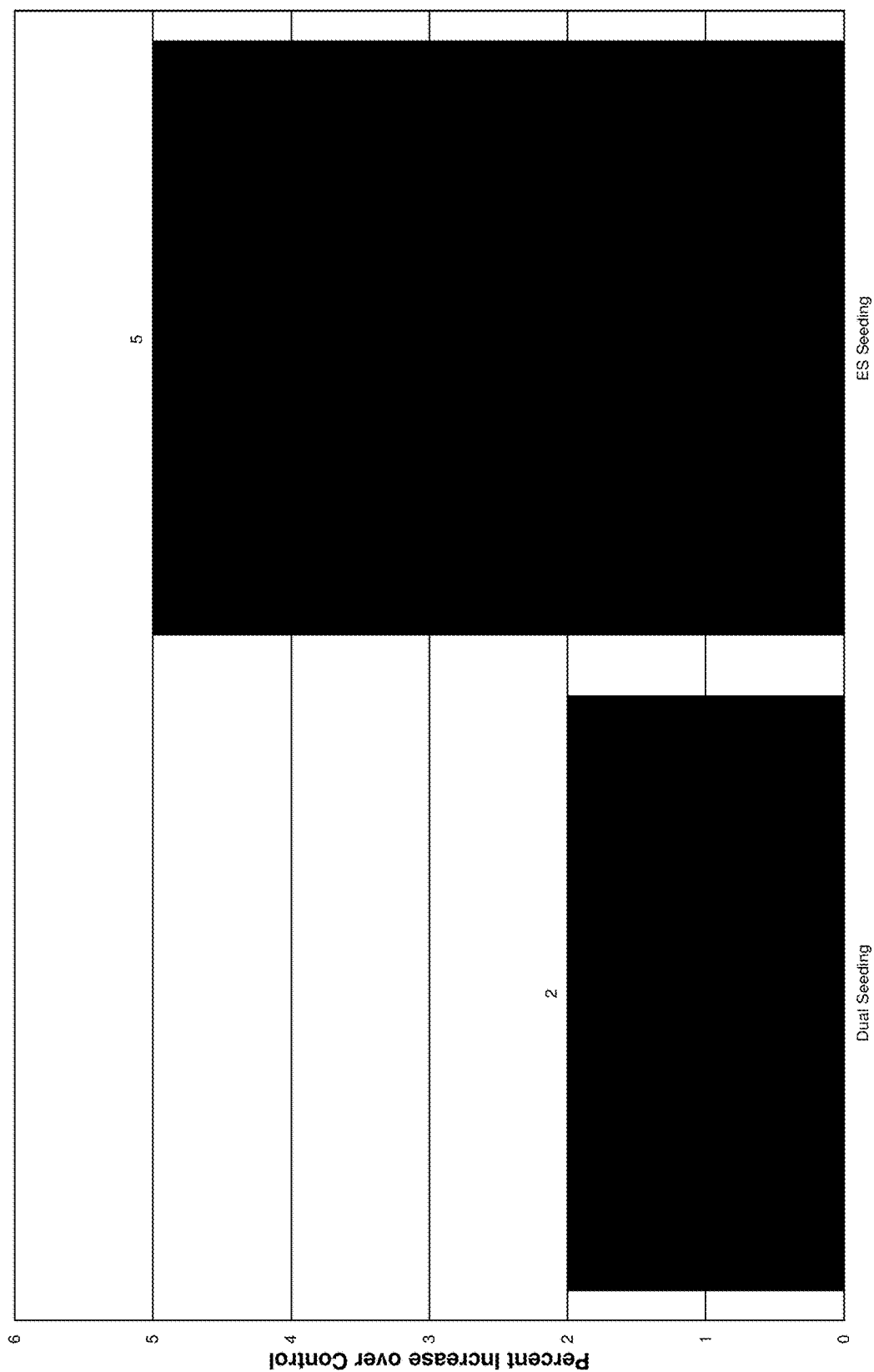
FIG. 7 shows the increase in Top Height of the storms due to ES seeding. This is the highest portion of the storm, which allows one to know the vertical growth. Clouds that grow more vertical will produce more rainfall due to the volume of the cloud. Additionally, having a high top-height indicates that the ice nucleation process is taking place hinting at the release of latent heat.

As briefly described above, FIGS. 4-7 show significant increases in the duration and size of clouds/weather events associated with ES seeding. Specifically, FIG. 4 shows increases in lifetime (i.e. duration as measured in minutes); FIG. 5 showed an increase in two-dimensional horizontal area (as measured in $km^2$); FIG. 6 showed an increase in three-dimensional volume (measured in $km^3$); and, FIG. 7 showed an increase in the vertical height of ES seeded clouds measured in km).

Figure 8:
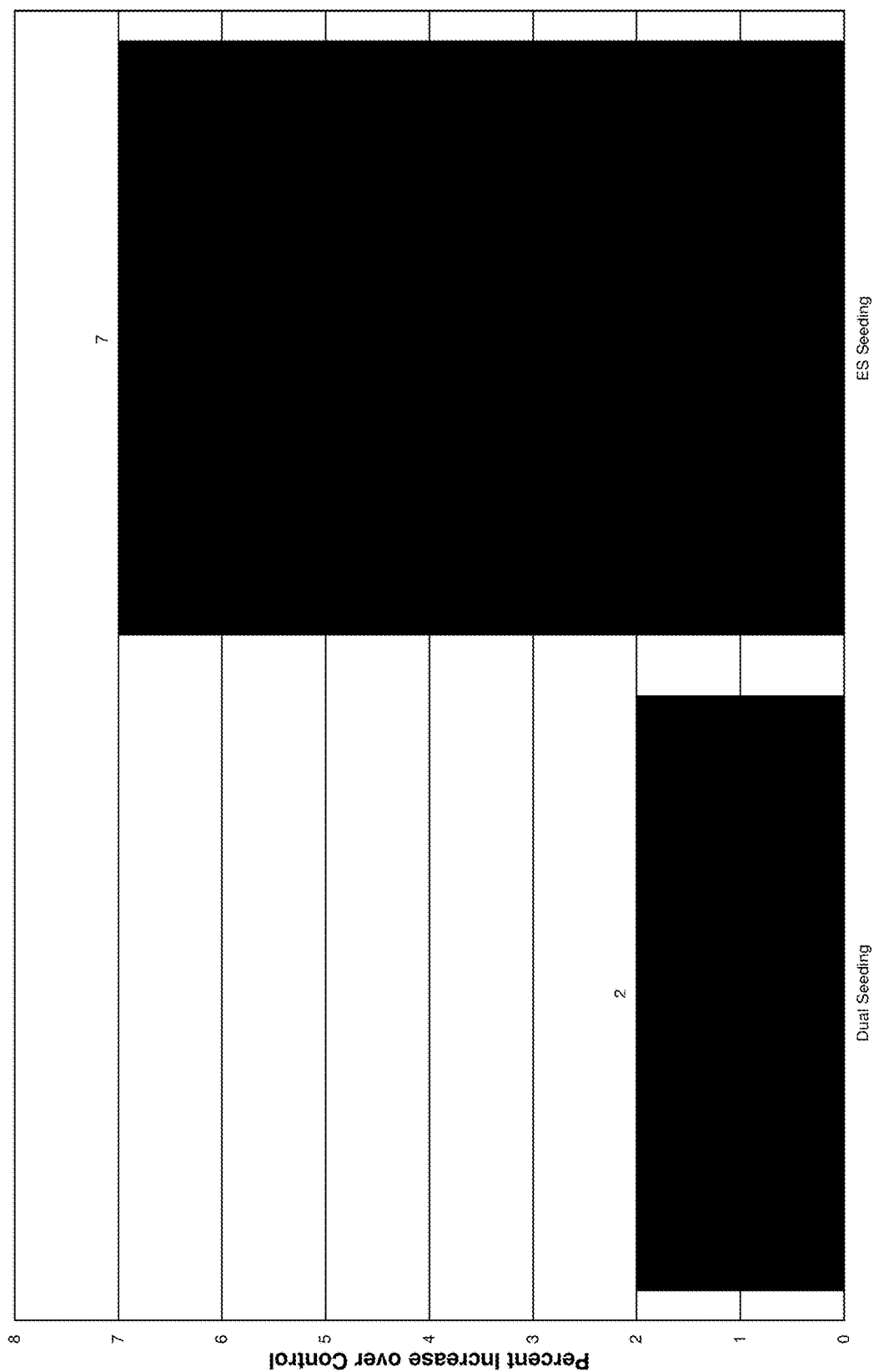
FIG. 8 shows the increase in Max dBz of the storms due to ES seeding. The term "Max dBz" is generally defined as the reflectivity produced by radar. Higher dBz's can indicate either) hail or a very high concentration of cloud droplets. By increasing Max dBz, it can show how efficient a cloud is working. These data generated are compared to hail reports to ensure cloud seeding is suppressing the hail, which has been documented in research and conducted operationally in several countries.
Figure 9:
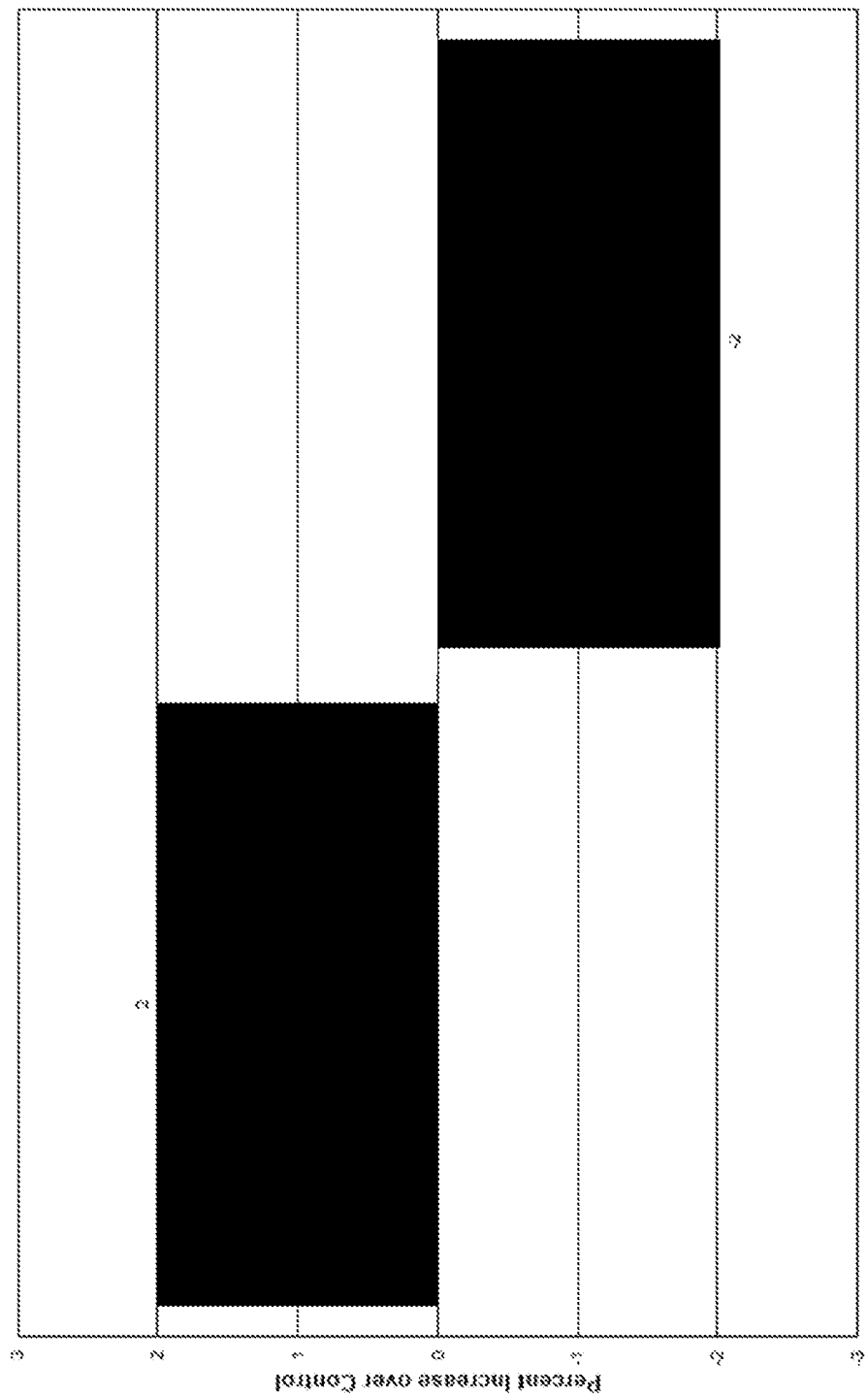
FIG. 9 shows the decrease in Top Height of Max dBz of the storms due to ES seeding. If the Top Height of Max dBz is higher, this is a good indication of hail. Hail is not desirable. However, when the Top Height of Max dBz is lower, the bulk of larger droplets and/or ice are lower in the cloud, thus having a higher likelihood of precipitation as rain instead of hail.
Figure 10:
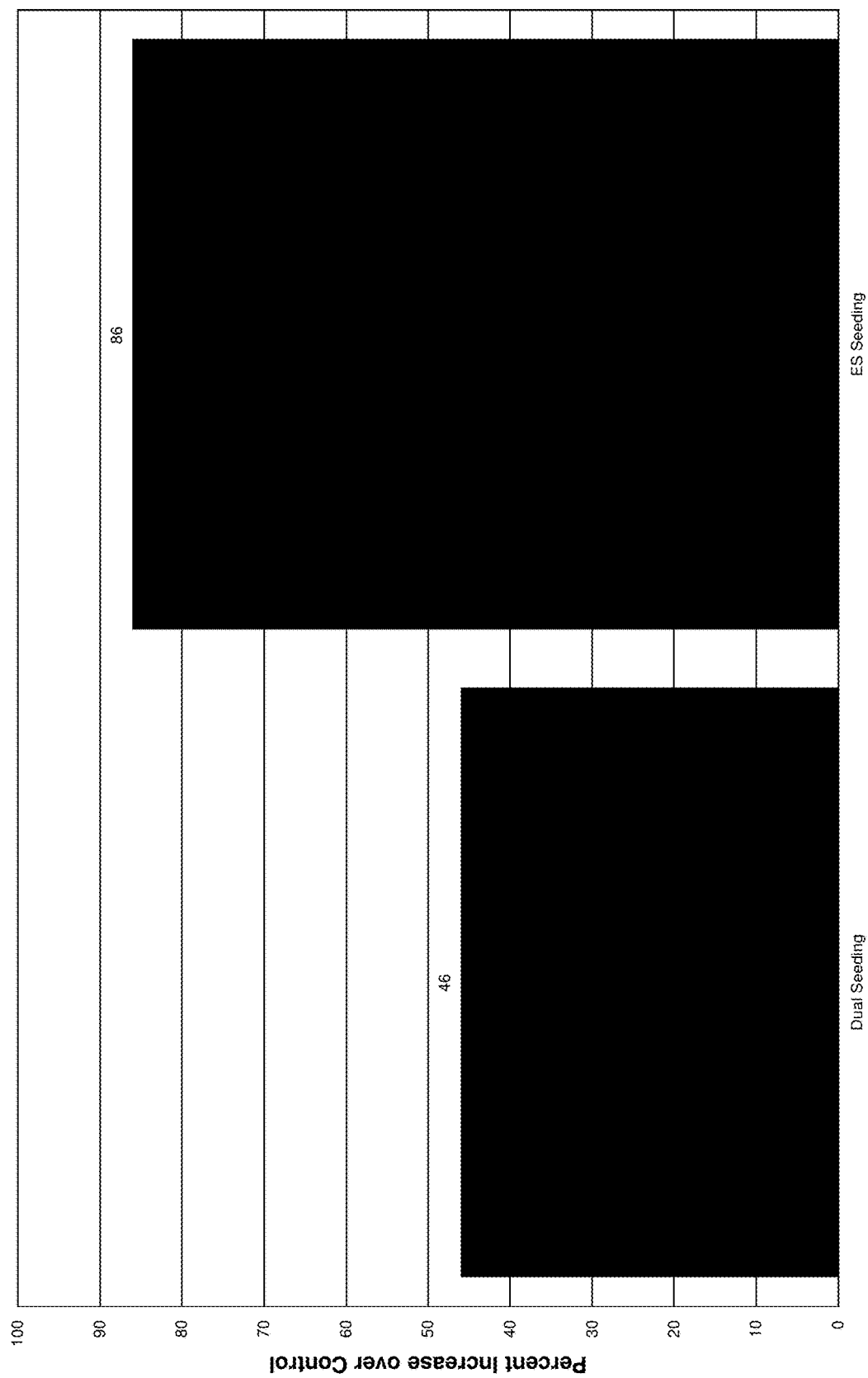
FIG. 10 shows the increase in Volume Above 6 km of the storms due to ES seeding. This is the amount of cloud likely to be below freezing. With a larger, deeper cloud extending beyond the freezing level, the ice nucleation process is more efficient.
Figure 11:
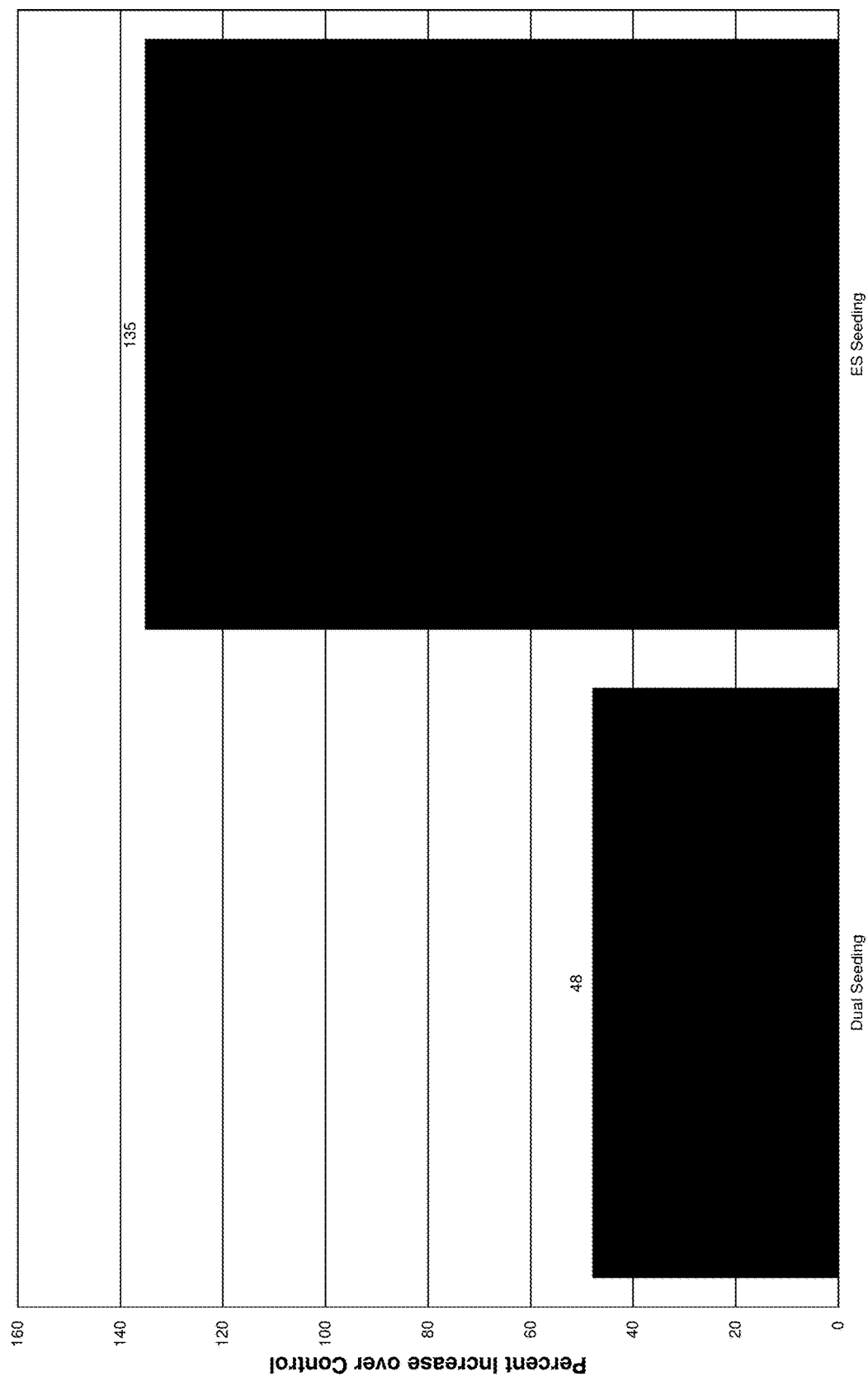
FIG. 11 shows the increase in Precipitation Flux of the storms due to ES seeding. Precipitation Flux is a parameter that includes a boxed area over a given time. Therefore, higher precipitation flux is a parameter which shows the intensity of the precipitating storm. In cloud seeding, the goal is to enhance rainfall, and this parameter is the primary indicator of this objective.
Figure 12:
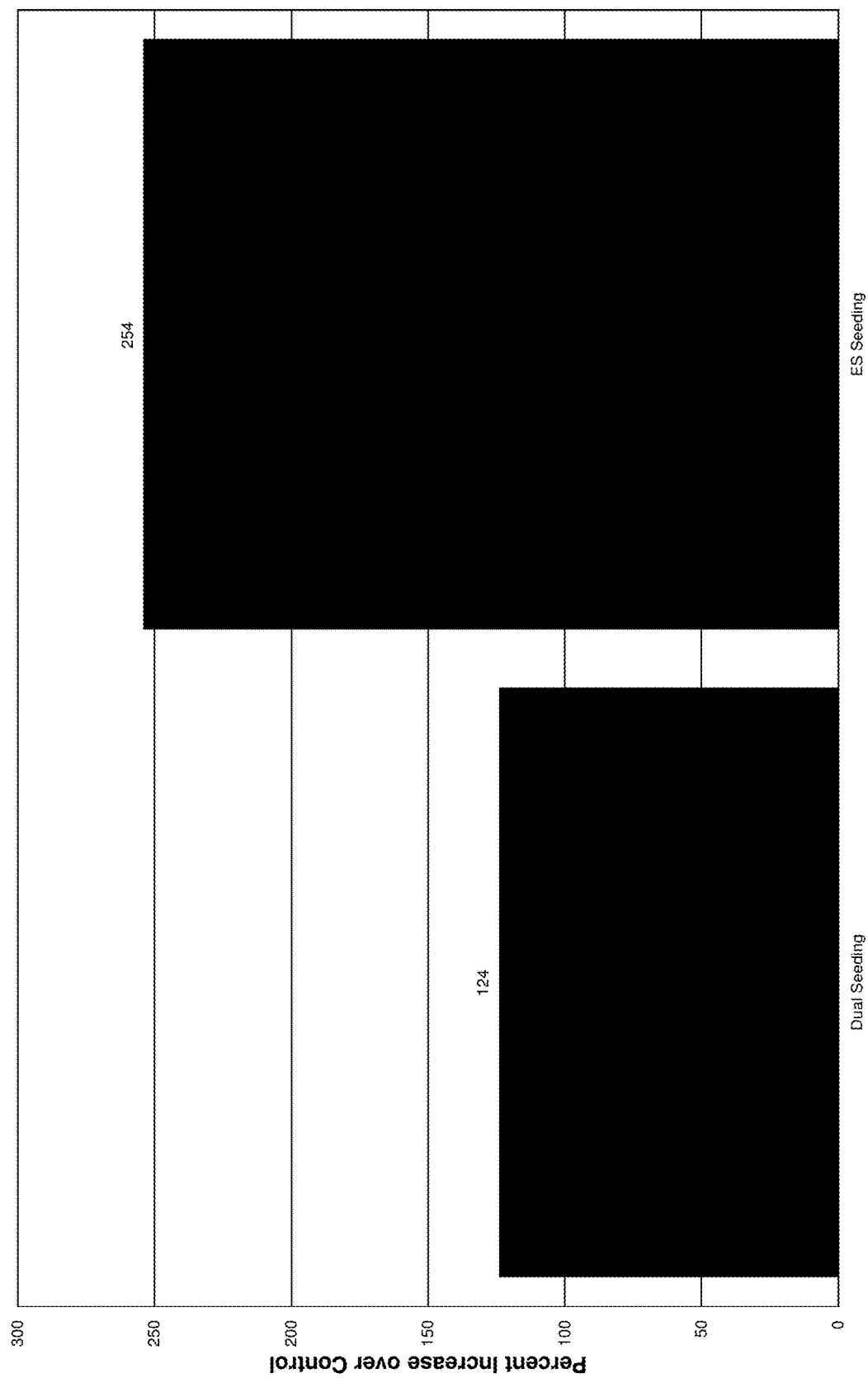
FIG. 12 shows the increase in Precipitation Mass of the storms due to ES seeding. Precipitation Mass is the mass of rainfall coming out of the cloud Similar to precipitation flux, this is a parameter that shows how much precipitation is falling out of seeded clouds versus unseeded clouds.
Figure 13:
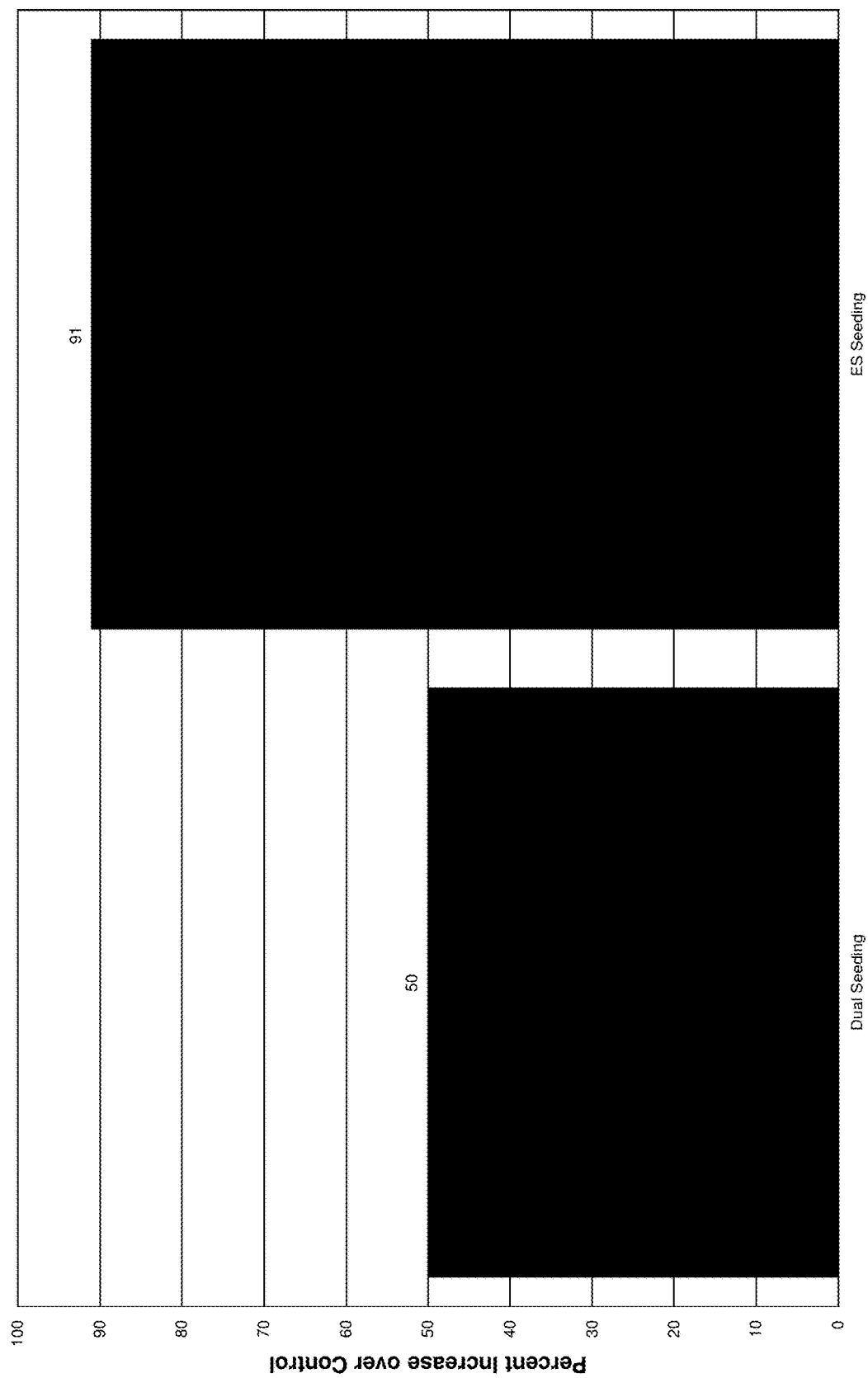
FIG. 13 shows the increase in Cloud Mass of the storms due to ES seeding. The Cloud Mass is similar to precipitation mass, however not all of the moisture falls out of the cloud. This provides insight into how much moisture is in the cloud. When compared to precipitation mass, efficiency can be calculated.
Figure 14:
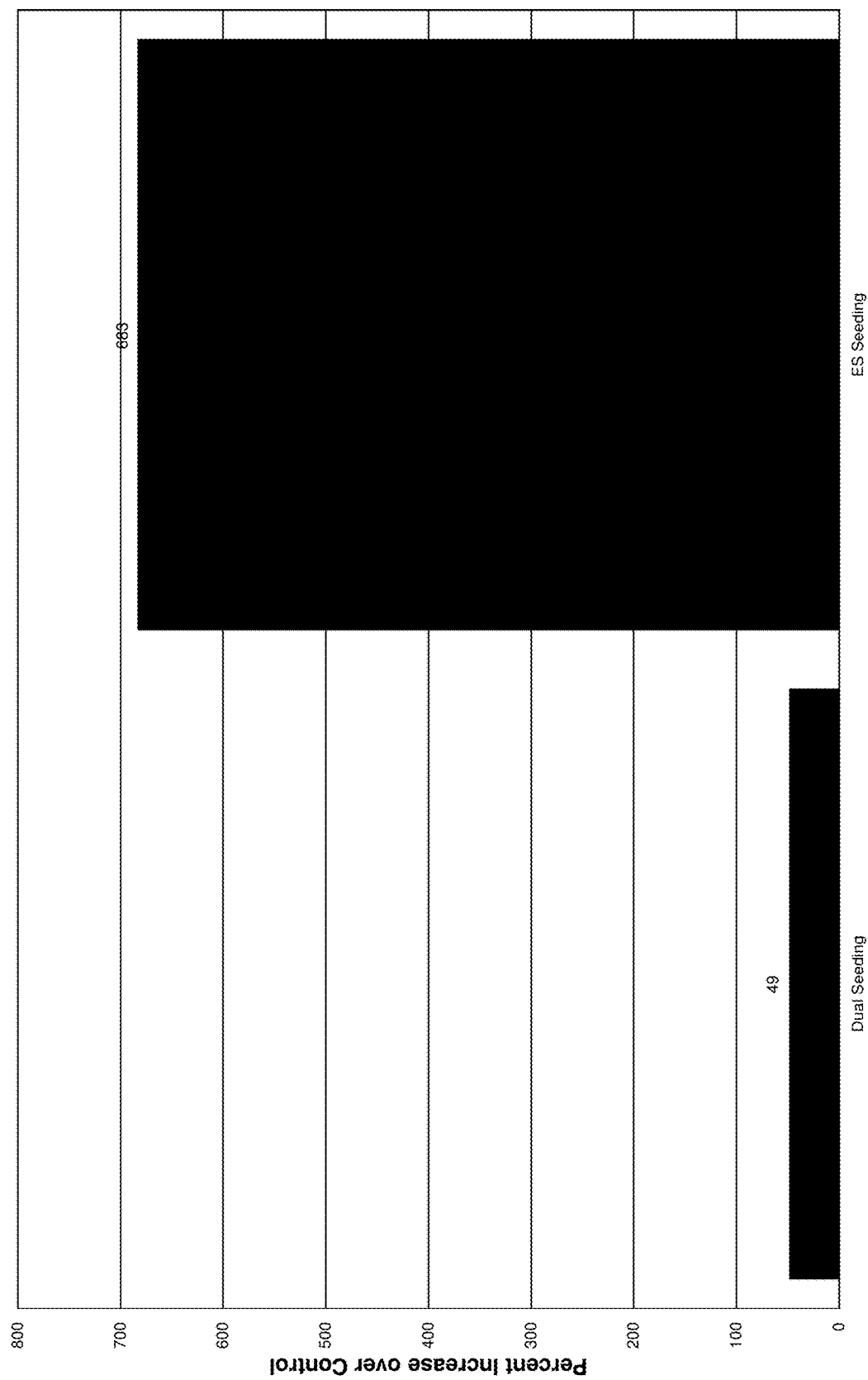
FIG. 14 shows the increase in "Nu" of the storms due to ES seeding. In the weather modification art, the term "Nu" describes the efficiency of the cloud, which is a comparison of precipitation mass to cloud mass.

FIGS. 8-14 show characteristics that are frequently associated with rain and/or hail. FIGS. 8-9 compare Max dBz characteristics with both control and dual seeding alternatives. FIG. 10 compares volume of a cloud (in $km^3$) above 6 km—which is a characteristic frequently associated with hail. FIG. 11 (directed to Precipitation Flux), FIG. 12 (Precipitation Mass), FIG. 13 (Cloud Mass), and FIG. 14 (Nu) are all measures of storm density and intensity. All these characteristics show significant improvement as a result of ES seeding.

In summary, the data gathered during the field tests confirm the benefits of ES cloud seeding. Significantly, FIGS. 8, 11, 12 and 14, showed an estimated 200 to 300 percent increase in the likelihood of rainfall, and an increase in storm intensity (Max dBz) and cloud efficiency (nu) relative to conventional cloud seeding methods. The data also shows that "Precipitation Flux"—which is a measure of the intensity of rainfall associated with a seeded cloud—more than doubled.

For the foregoing reasons, it is clear that the method and apparatus described herein provides an innovative cloud seeding system. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints.

For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A method of seeding clouds, the method comprising the steps of:
   (a) Equipping an aircraft with a spraying system comprising at least one sprayer, the sprayer comprising:
       (1) a spray nozzle that produces an atomized spray;
       (2) an electrode that surrounds the nozzle;
   (b) taking off in the aircraft and locating a cloud with an updraft of at least about 100 feet/min;
   (c) providing a pressurized fluid to the spray nozzle so that the fluid sprays from the nozzle; and,
   (d) electrically charging the electrode so that the fluid spraying from the nozzle has an electrical charge, the fluid spraying from the nozzle being drawn upwardly into the cloud.

2. The method of claim 1 further comprising:
   (e) when the updraft dissipates below 100 ft/min, turning off the pressurized fluid and searching for a pocket or a cloud where the updraft exceeds 100 ft/min.

3. The method of claim 2 further comprising:
   (f) when an area is located where the updraft exceeds 100 ft/min, repeating steps (c), (d), (e), and (f) until the fluid is exhausted.

4. The method of claim 1 wherein, in step (a), the spraying system comprises at least 2 vertically aligned sprayers.

5. The method of claim 1 wherein, in step (a) (1), the sprayer generates a volume medium diameter spray between 50 and 200 um.

6. The method of claim 1 wherein, in step (a) (1), the sprayer generates a volume medium diameter spray of about 120 um.

7. The method of claim 1 wherein, in step (a) (1), the nozzle spray angle is 60°-90° at 100 psi.

8. The method of claim 1 wherein, in step (a) (1), the nozzle spray angle is about 80° at 100 psi.

9. The method of claim 1 wherein, in step (a) (2), there is a gap between the trailing edge of the electrode and the spray nozzle orifice of about 0 to 10 mm.

10. The method of claim 1 wherein, in step (a) (2), there is a gap between the trailing edge of the electrode and the spray nozzle orifice of about 4.9 mm.

11. The method of claim 1 wherein, in step (b), the cloud is positioned between 1,000 and 15,000 feet above ground level.

12. The method of claim 1 wherein, in step (c), the fluid comprises water.

13. The method of claim 1 wherein, in step (c), the fluid comprises a chargeable fluid.

14. The method of claim 1 wherein, in step (c), the water is pressurized to about 50-100 psi.

15. The method of claim 1 wherein, in step (c), the fluid has a flow rate out of the sprayer of about 5 to 10 gallons per minute.

16. The method of claim 1 wherein, in step (d), the electrode imparts a positive charge to the water sprayed from the nozzle.

17. The method of claim 1 wherein, in step (d), the electrode is charged with a 2 mA current at +5,000 to 15,000 V.

* * * * *